March 9, 1965 E. BRICHARD 3,172,648
METHOD OF AND APPARATUS FOR IMPROVING THE PREHEATING OF
PULVEROUS MATERIALS, THEIR INTRODUCTION INTO MELTING
FURNACES AND THEIR MELTING THEREIN
Filed April 4, 1960 3 Sheets-Sheet 1
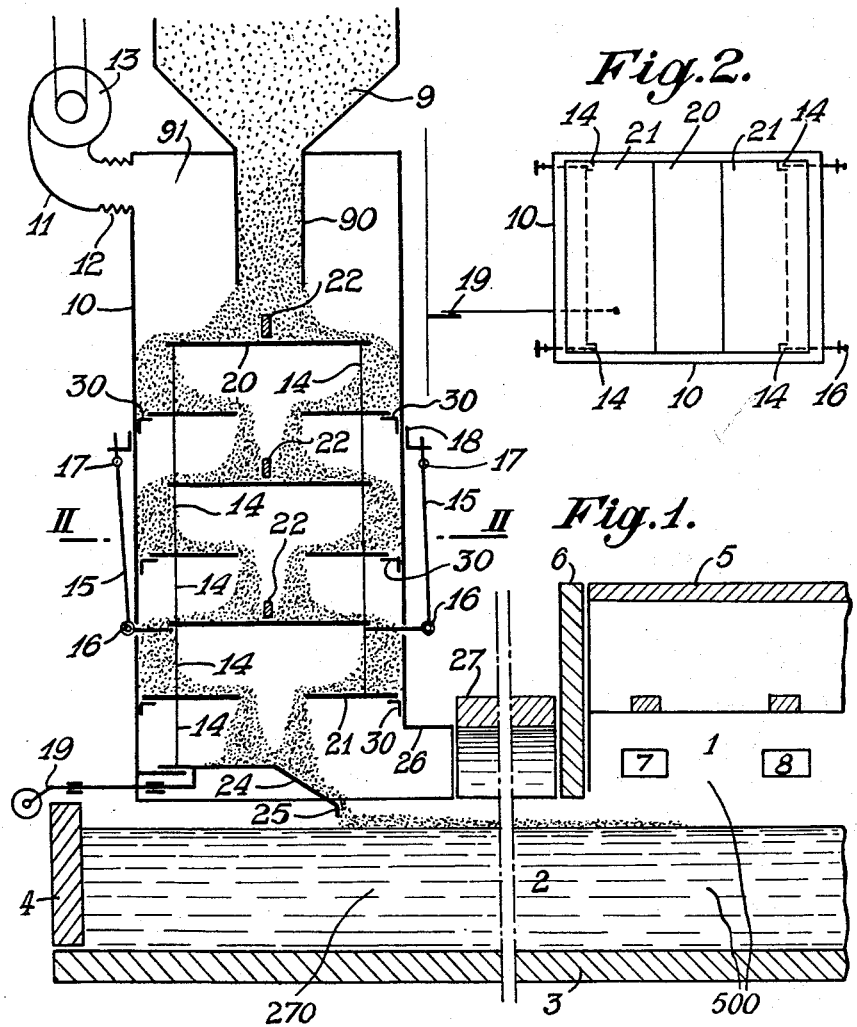
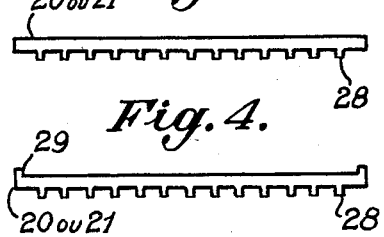
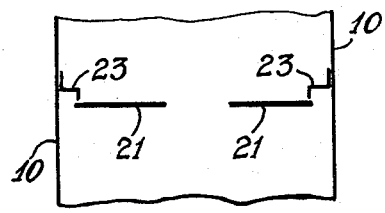
INVENTOR
EDGARD BRICHARD
BY
Corey, Hart + Stemple
ATTORNEYS

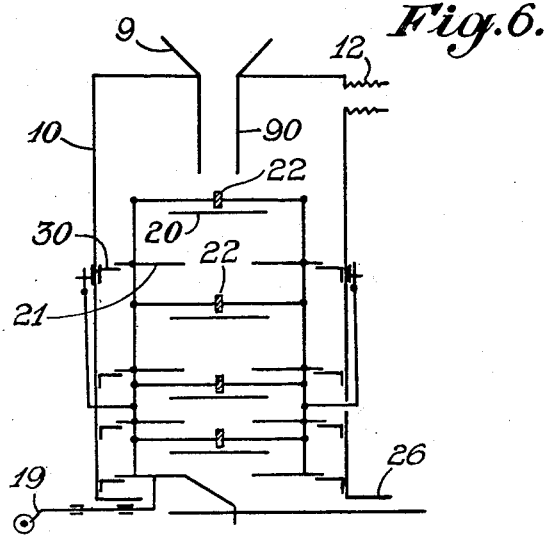
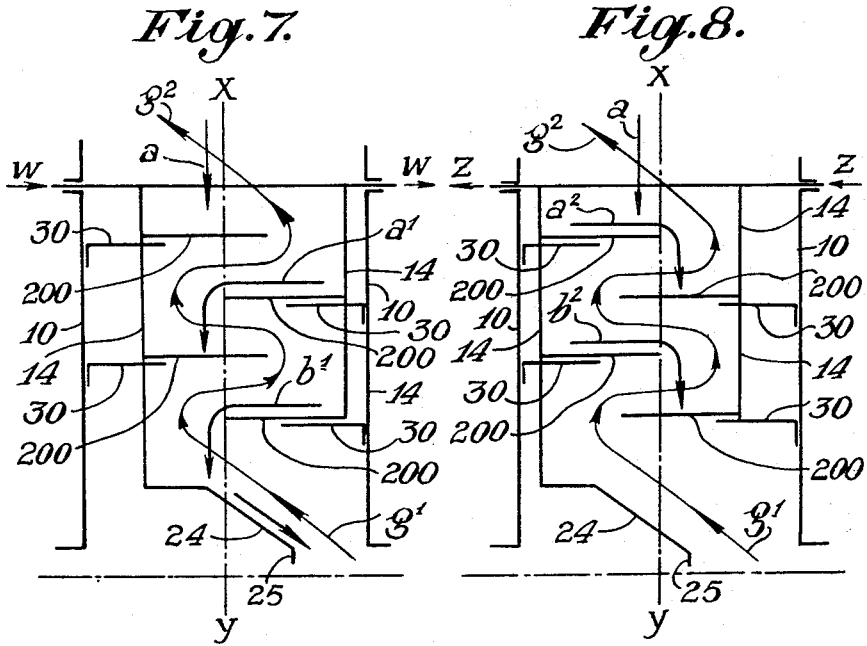

INVENTOR
EDGARD BRICHARD

United States Patent Office 3,172,648  
Patented Mar. 9, 1965

3,172,648  
METHOD OF AND APPARATUS FOR IMPROVING THE PREHEATING OF PULVEROUS MATERIALS, THEIR INTRODUCTION INTO MELTING FURNACES AND THEIR MELTING THEREIN  
Edgard Brichard, Jumet, Belgium, assignor to Union des Verreries Mecaniques Belges Societe Anonyme, Charleroi, Belgium, a Belgian company  
Filed Apr. 4, 1960, Ser. No. 19,547  
Claims priority, application Belgium, May 12, 1959, 458,448, Patent 578,627  
15 Claims. (Cl. 263—31)

The present invention relates to a method of and an apparatus for improving the preheating of pulverous materials, their introduction into melting furnaces and their melting therein, with particular application to the feeding of vitrifiable starting materials to a tank furnace for glassmaking.

The subject of the invention is hereinafter described as applied to the glass industry, but it is to be understood that it is also applicable to other types of furnaces.

Manufacturing processes are known, in which the starting materials are introduced while cold into the furnace with the aid of continuously and discontinuously operating devices, generally protected by a hydraulic or other cooling means which absorbs the heat from the furnace and further intensifies the cooling of the materials introduced into the furnace.

In these methods, the said materials are subjected to a heating only after they have been introduced into the furnace, in which they receive, at high temperature, the quantities of heat necessary for heating them, for ensuring completion of the endothermic reactions, and for imparting thereto sufficient fluidity to ensure their homogenisation and their refining.

As is known, it has been observed in glassmaking that the greater part of the heat supplied to the starting materials is devoted to increasing the temperature of the said materials rather than to producing the reactions.

In the known methods, the said materials are deposited on the molten bath and are subjected to the radiation from the flames circulating above them. Since they are bad conductors of heat, the heat exchange is poor and the output of the furnace is low.

According to the present invention, it has been observed that it is desirable to limit as far as possible the quantity and the rate of flow of the fumes in the preheating zone in order to limit the entrainment of dust in the latter.

This makes it necessary to utilise fumes at the highest possible temperature in order to obtain a good yield.

Moreover, in accordance with the present invention, it has been established that it is important to extract the fumes directly from the furnace rather than from the chimney or from the flues leading to the latter.

Thus, gases at relatively high temperature are employed, which make it possible to utilise a correspondingly smaller volume and to avoid the heat losses unavoidably set up when all the fumes are caused to enter regenerators and the various ducts preceding or succeeding the latter.

However, certain precautions are necessary to take fumes at the temperature of the furnace hearth, that is to say, at about 1500° C., because in this case there is a danger of rapid deterioration of the metal parts of the apparatus.

According to the invention, the problem is solved by effecting the heat exchange in two stages, namely:

(a) The materials entering the preheating apparatus are first brought into contact in the latter with substantially cooled escaping fumes and then, as they progress, with fumes of progressively increasing temperature, so that they arrive at the bottom of the apparatus at a temperature which may reach 700° to 800° C., and undergo an initial fritting or melting before being deposited on the bath.

Throughout this travel, the heat exchange takes place mainly by conduction, that is to say, by contact of the fumes with the materials and with the parts of the apparatus by which they are supported.

(b) The materials leaving the preheating apparatus are deposited on the bath in the doghouse of the tank, which is covered by a long arch, for example of a length of 1.50 m. to 4.50 m., and of low height, that is to say, the crown of which is situated at a maximum at, for example, several tens of centimetres from the bath, the said doghouse of the tank being advantageously shielded from the direct radiation of the furnace, while the fumes leaving the hearth of the furnace at about 1500° C. are constrained to pass under the said arch and to cool in contact therewith and with the materials floating on the bath, so as to reach about 1000° C. at the time of penetration into the preheating apparatus.

In this travel, the fumes therefore give up their heat on the one hand to the batch already being melted, and on the other hand, to the arch of the doghouse, which in turn radiates towards the batch. The latter continues to heat up during its travel under the said arch and is already in a state of effervescent fusion when entering the furnace proper.

It will be noted that the stream of batch advancing towards the bath in the doghouse is in no way heated to the detriment of the furnace, because the segmental arch of this doghouse prevents radiation from the hearth towards the doghouse, so that the heat exchange takes place exclusively with fumes sucked towards the preheating apparatus, *and therefore with-recovery of lost heat.*

This method has the following advantages and features:

Fumes at their maximum temperature are employed, so that it is possible to limit their quantity and their rate of flow to a minimum;

The recovery takes place without any direct extraction of heat from the furnace, but simply by preheating of completely burnt gases, which are in the state in which they would normally be discharged by the regenerator;

The fumes exchange a part of their heat with the continuous stream of material traveling towards the bath under the arch of the doghouse and penetrate into the preheating apparatus at the time when their temperature no longer constitutes a danger to the metal parts of the said apparatus;

Since the materials are already in a state of effervescent fusion at the time when they are subjected to the radiation from the flames and from the hearth, the heat exchange takes place under good conditions of yield.

In contrast thereto, in the known methods, the stream of batch which enters the furnace is an insulating mass, of which only the surface becomes heated and melts, while the core undergoes the same effect only in proportion as the layers which protect it have melted and have trickled on to the sides of the stream of batch.

Broadly speaking therefore, the subject of the invention consists, on the one hand, in a method of improving the preheating and the introduction into melting furnaces of pulverous materials, as also their melting therein, which is applicable notably to the vitrifiable batch melted in tank furnaces for glassmaking, in which method the materials are introduced into the furnace in counter-current to hot fumes coming from the furnace, characterised in that the pulverous materials are subjected to a continuous preheating to a temperature close to their fritting point, the said materials being circulated with continuous agitation in counter-current to hot fumes taken directly from below the segmental arch of the doghouse of the furnace, which doghouse may be shielded or adapted to be shielded from the direct radiation from the said furnace, the said materials thereafter being deposited and propelled forwards on the bath in the said doghouse and subjected, during their forward propulsion, to a more intense heating, for example up to their effervescent fusing temperature, by the radiation from the said arch and by their contact with the same fumes, which are extracted, above the molten materials entering the furnace, in a quantiy such that, after having given up a part of their heat during their passage below the said arch, they reach the continous agitation zone at a sufficiently low temperature to prevent melting of the materials in the agitation zone, in which the fumes give up to the materials the remainder of their sensible heat before being discharged.

On the other hand, the subject of the invention consists, broadly speaking, in a apparatus for improving the preheating of pulverous materials, their introduction into melting furnaces and their melting therein, which is applicable notably to the vitrifiable batch employed in tank furnaces for glassmaking, comprising a charging device combined with the furnace, by which charging device the materials are introduced with agitation into the furnace in counter-current to gases extracted from the latter, characterised in that it comprises in combination:

A substantially or approximately vertical gas-tight closed chamber or conduit communicating at its lower end in substantially gas-tight fashion with the doghouse of the furnace, which doghouse is arranged as hereinafter indicated, and at its upper end with a pressure-reducing device and a charging hopper; a frame or chassis mounted within the said closed chamber in such manner as to be reciprocable in a substantially horizontal direction, the said frame or chassis supporting a series of substantially horizontal superposed plates, comprising advantageously continuous or uninterrupted plates co-operating with fixed scrapers supported, for example, by the said closed chamber or conduit and plates forming a central opening co-operating with fixed peripheral angle irons supported, for example, by the said enclosed space or conduit, as also if desired a lower plate simultaneously performing the function of a push member serving to deposit on the surface of the molten bath and to propel thereon the preheated starting materials deposited on the said bath, the said frame, the said plates and the said angle irons being so disposed in relation to one another and in relation to the said closed chamber or conduit as to afford a non-rectilinear passage to the starting materials and to the fumes;

A doghouse, if desired protected or adapted to be shielded from the direct radiation of the furnace, the said doghouse advantageously being of increased length and being provided with an advantageously segmental arch;

A control device adapted to impart to the movable parts in the said closed chamber a reciprocating motion of variable speed, as also a pressure-reduction device adapted to impart an adjustable speed to the fumes rising in the said chamber.

The operation carried out in accordance with the invention is very advantageous if the fumes are normally evacuated towards the chimney without recovery of their sensible heat, and it is also advantageous in the case of an insufficiency of regenerating apparatus, if any.

Finally, the operation is especially interesting in the case of regenerators of sufficient dimensions if the quantity of sensible heat contained in the fumes leaving the melting furnace exceeds that utilized to raise the air introduced by the combustion to the temperature of the said fumes.

In this case, it is therefore possible to tap the predominant part of the fumes for the purpose of preheating the composition without thus substantially reducing the regeneration of heat by the combustion air. The remainder of the fumes will pass through the regenerators in the usual way.

If the furnace is not provided with chambers for the regeneration or recuperation of the heat of the fumes, the maximum possible quantity of fumes will be extracted to heat the batch as far as possible.

It has already been mentioned in the foregoing that the batch is a bad conductor of heat. When the materials are heated in the furnace, they constitute a mass which has very low permeability to the radiation from the flames and which become heated substantially only on the surface, while in accordance with the present invention the surface of contact between the materials travelling towards the furnace and the fumes is constantly renewed in the preheating chamber and the heat exchange is considerably increased by virtue of the intimate contact of the said materials with the gases and with the metallic agitating members of the apparatus, which are themselves heated by the fumes.

It has also been observed that if the batch remained stationary, it would tend to form compact, hard cakes which would block the apparatus. If, on the other hand, the batch is constantly broken up and agitated, a granular frit is obtained, which melts very well.

Attempts to break up the batch by slicing it by means of members extending through the batch have given rise to adhesion, which has ultimately blocked the apparatus.

According to the invention, on the other hand, satisfactory results are obtained by effecting the continuous fragmentation of the batch by pushing it in an overhanging condition on a cascade of superposed plates actuated with continuous movements in relation to abutments fixed to the frame or to the fluid-tight chamber. The batch thus pushed in overhanging condition disintegrates normally under the action of gravity and falls from plate to plate until it reaches the glass bath under the arch of the doghouse in proximity to the point from which the fumes are tapped.

In addition, it has hereinbefore been stated that in accordance with the invention the incandescent fumes are preferably taken from the furnace above the melting batch. Now, at this point, the furnace fumes are charged with dust which they carry along by their velocity, and with alkaline vapours which they have volatilised by reason of the high temperature. This charge is doubly harmful, because it brings about a modification of the batch introduced into the furnace, and in addition it enters the checkerworks, in which it is deposited and thus causes corrosion and obstruction.

According to the invention, it is distinctly advantageous to extract preferentially from the furnace the fumes which are above the molten batch and to cool them on the cold batch, to which they give up the said charge undesirably derived from the batch introduced into the furnace.

It has been observed that if the extraction of fumes is so controlled that they leave the exchanger at a temperature below their dew point, they will have condensed, in the batch, steam and a proportion of acid compounds such as sulphurous and sulphuric compounds.

It has also been observed that this results in some materials being dissolved, which renders more intimate their contact with the sand around which they will crystallise in the subsequent phases of the heating process.

By reason of the intimate nature of this contact, the melting of the whole will be more rapid and will give a more homogeneous product.

Moreover, the entrainment of dust by the fumes is thus rendered substantially impossible.

According to the invention, the starting materials are introduced into the preheating chamber by means of a feed hopper which is always maintained sufficiently full for it to constitute a gas-tight seal, and the materials leaving the said hopper are constrained to descend towards the furnace while undergoing a substantially continuous agitation accompanied by successive falls between plates banked as hereinbefore mentioned.

In addition, in accordance with the invention, the introduction of the cold materials into the preheating chamber is desirably so effected as to leave between the point at which the materials enter the said chamber and the point at which the fumes are discharged at a temperature very slightly different from the ambient temperature a free space for the fumes before they are discharged from the chamber, thus preventing the obstruction of the orifice through which they are discharged from the latter.

A number of embodiments of the invention are hereinafter described with reference to the accompanying drawings, in which:

FIGURE 1 illustrates diagrammatically a vertical section through a first constructional form of the preheating and charging device and through the adjoining part of a tank furnace, constructed in accordance with the invention;

FIGURE 2 illustrates diagrammatically a section along the line II—II of FIGURE 1;

FIGURES 3 and 4 illustrate two details;

FIGURE 5 illustrates diagrammatically a vertical section through a constructional form of the preheating device according to FIGURE 1;

FIGURE 6 illustrates diagrammatically a vertical section through another constructional form of the preheating device according to the invention;

Figure 9:
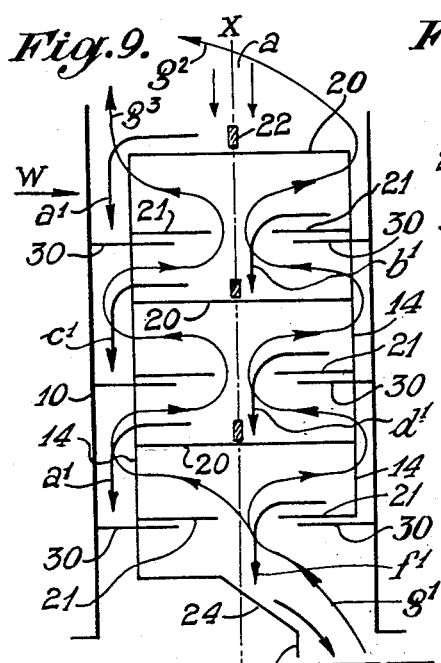

FIGURES 7, 8, 9, 10, 11 and 12 are diagrams serving to explain in greater detail the operation of the preheating device according to the invention, FIGURES 7 and 8 illustrating a simplified constructional form of the device, while FIGURES 9, 10 and 11, 12 illustrate respectively the constructional forms according to FIGURES 1 and 6, in two positions in which their movable systems are diametrally opposed.

According to FIGURE 1, the glass furnace 1 comprises a tank containing the molten glass 2 and represented by a base 3 and an end wall 4.

The left-hand part 270 of the tank is a feed extension means called a well, into which are introduced the starting materials which are deposited on the molten bath. The right-hand part 500 of the tank is the melting zone over which an arch 5 is mounted, and which is limited towards the left by an end wall 6, this zone, called the "hearth," being heated in the usual manner by burners 7, 8 which develop flames above the glass bath.

According to the invention, the well 270 is advantageously provided with a relatively long, segmental arch 27, which may be shielded from the direct radiation from the hearth. Jointed to the arch 27 is a conduit 10 integrally formed with a hopper 9 mounted on the upper end thereof in such manner as to constitute a substantially gas-tight duct. A duct 11 is connected at one end to the upper part of the conduit 10 through a flexible union 12 and on the other hand to a pressure-reduction device 13, which sets up a negative pressure in the conduit 10.

Disposed within the conduit 10 is a chassis or frame 14 suspended, for example from rods 15, 15 pin-jointed at 16, 16 and at 17, 17 and in turn suspended from fixed points 18, 18. Thus, the frame 14 can rock horizontally to the left and to the right under the action of a rod and crank system 19.

The frame 14 consists of vertical uprights supporting a series of horizontal plates disposed one above the other, the plates 20 being continuous and alternating with plates 21 interrupted at their centre.

Secured to the walls of the conduit 10 are flat irons or rails 22 disposed slightly above the plates 20, so as to be able to scrape the latter when they are in motion. Angle irons 23 (see FIGURE 5) are also fixed to the walls of the conduit 10 so that their lower vertical web is located slightly above the plates 21 and can also scrape the upper face of these plates.

Naturally, the members 22 and 23 may be constructed in various forms without detriment to their operation. For example, the irons 23 may be replaced by angle irons 30 (FIGURES 1 and 6) on which material will accumulate in such manner as to form an abutment and to constrain the fresh materials falling on to the plates 21 to move towards the centre at each reciprocating movement.

It is to be noted that the hopper 9 is extended within the conduit 10 by a duct 90 which leads the materials down on to the upper plate 20, so as to provide above the latter a free space 91 for the fumes before they enter the duct 11, the space 91 thus preventing obstruction of the outlet 12 by the materials introduced into the furnace. The duct 90 terminates at a relatively short distance above the upper plate 20, so that the latter effectively presents untimely emptying of the hopper 9.

The apparatus operates as follows:

The hopper 9 is fed with materials to be introduced into the furnace, and it is always filled sufficiently to form a fluid-tight seal preventing any entry of air through this orifice. The apparatus 13 is set in operation and sets up a negative pressure in the conduit 10.

The rod and crank system 19 is also started and imparts a reciprocating movement to the frame 14. The materials leaving the hopper 9, which may be provided with a system for the adjustment of the rate of flow (not shown), fall on to the first plate 20.

The reciprocating movement of the frame 14 spreads out the material accumulating on the plate 20. When its level reaches the flat iron 22, the material is pushed laterally first in one direction and then in the other, so that one part advances in one direction and another part in the other direction as the reciprocating movement of the frame is maintained. The material thus reaches the edge of the plate 20 and falls on to the plate 21 on which, as a result of the presence of the angle irons 23 or 30, it commences to progress in the opposite direction, that is to say, from the walls of the conduit 10 towards the centre, so as to reach the inner edges of the plate 21 and to fall on to the second plate 20, and so on to the bottom of the apparatus.

The last plate has a different form from the plates 20 in the sense that it is provided with an inclined surface 24 terminated by a lip 25, so that it is possible for the material to be deposited on the glass bath 2 and then, owing to the participation of the lip 25 in the reciprocating movement of the system 14, 20, 21 to progress over the bath 2 under the arch 27 of the doghouse 270 in the direction of the hearth 500 of the furnace 1.

As has hereinbefore been mentioned, the conduit 10 is so disposed as to be connected to the furnace in a substantially fluid-tight manner, that is to say, in such manner that its walls extend right up to the walls of the furnace and of the well or doghouse.

Thus, the wall of the conduit 10 which faces the side of the furnace is terminated by a collar 26 which forms an extension of the arch 27 of the well, disposed against the end wall 6 of the furnace. The fluid-tightness may be improved by the interposition of packings of refractory materials.

The opening between the glass bath and the lip 25 is closed by the introduced material itself and therefore constantly forms a seal which is substantially impermeable to the fumes.

Thus, gases from the furnace are sucked into the conduit 10 in which a negative pressure is formed by the device 13 and circulate therein in counter-current to the materials in order to be discharged through 11 after having given up the greater part of their heat to the starting materials travelling towards the furnace.

It will be noted that the heat exchange in the conduit 10 takes place in two ways:

(1) By direct transmission, due to the direct contact of the materials falling through the current of hot gases rising in the conduit.

(2) By indirect transmission, due to the heating of the plates 20, 21 which are in contact at their lower faces with the fumes and which give up to the materials the heat thus stored by their upper faces.

The indirect exchange will be further improved by providing the plates 20, 21 with ribs or fins 28 (see FIGURE 3).

The wear on the plates 20, 21 can be reduced by providing them with an edge which is slightly bent-up at 29 (see FIGURE 4) so that the said plates retain thereon a light bed of material of the same thickness as the rim 29, the travel of the material thus taking place, not directly on the plates, but on the material itself.

The entrainment of dust towards the duct 11 will be prevented by disposing between the flexible union 12 and the outlet from the conduit 10 a baffle system (not shown), such as a cyclone or a similar device, which will arrest any material entrained by the fumes and cause it to fall on to the plates 20, 21 or on to a member (not shown) on which they will be recovered.

However, it is particularly to be noted that the method according to the invention does not produce any appreciable entrainment of dust, because, as has been stated in the foregoing, it consists essentially in utilizing gases at very high temperature, which makes it possible to effect the heat exchange with a minimum rate of gas flow and therefore with a minimum entrainment of dust.

The space reserved for the passage of the fumes may be increased by increasing the spacing between the successive plates in the vertical direction. Conversely, the said space may be so reduced that the gases must pass through the batch. The transmission of heat is greatly accelerated or increased if the fumes are thus caused to flow through layers of batch. The danger of rapid clogging of the mass due to fritting is avoided by means of a sufficient agitation of the mass. This method of heat transmission by the passage of the fumes through the bed of materials may be applied only in some of the stages, the height of which is reduced in this case, while the other stages are of sufficient height to allow the passage of fumes above the materials travelling towards the furnace.

The method according to the invention may be applied notably with fumes which are at a relatively low initial temperature. In this case, it is sufficient to dispose the superposed plates 20 and 21 closer together.

Depending upon the nature of the materials, the lower plates of the device will be more especially brought closer together (see FIGURE 6), which will make it possible to obtain the best yield with high-temperature fumes.

If fritting is to be feared under these conditions, the spacing between the lower plates will be increased in order to increase the mobility of the material at this point, and the upper plates will be brought closer together in order to obtain a better heat exchange with the fumes at lower temperature (the danger of clogging at this point being non-existent) and thus to ensure a higher total yield.

It is to be noted in addition that, in accordance with the embodiment of the invention as illustrated in FIGURE 6, the plates 20 are attached to the conduit 10 and are consequently fixed, while the bars 22 are attached to the suspended frame 14 and are consequently movable. There is thus obtained an effect similar to that obtained with the device according to FIGURE 1, but with a different arrangement which, under certain conditions, can be more readily constructed.

FIGURES 7 and 8 illustrate the principle of the preheating device of the invention in a particularly simplified constructional form. There will be seen therein the fixed conduit 10, in which the frame 14 is arranged to reciprocate in the direction of the arrows $w$ (FIGURE 7) and $z$ (FIGURE 8), the conduit 10 supporting the fixed angle irons 30 co-operating with the movable plates 200 supported by the frame 14. The vertical axis of the apparatus is denoted by $x$, $y$, the admission of the materials by the arrow $a$, the path of the fumes by the arrow of non-rectilinear, for example more or less sinusoidal form $g^1g^2$. It will be seen that during the movement of the movable system 14, 200 in the direction of the arrows $w$ (FIGURE 7), it is the material situated on the plates 200 to the right of the axis $x$, $y$ which fall on to the plates 200 situated to the left of the axis $x$, $y$, while during the movement of the movable system 14, 200 in the direction of the arrows $z$ (FIGURE 8), it is the materials situated on the plates 200 to the right of the axis $x$, $y$, which fall on to the plates 200 to the right of the axis $x$, $y$, and so on. Therefore, at all instants, one half of the plates supplies materials and curtains of materials always pass through the non-rectilinear, for example more or less sinusoidal current of the fumes $g^1$, $g^2$ (except at the dead points, that is to say, for a negligible period of time), or heaps of materials extend through the said currents of fumes if the distance between the plates 200 and/or the rate of flow of the materials are so chosen or adjusted that the materials accumulate on the said plates in such manner as to form thereon heaps which rise from one plate to or approximately to the corresponding upper plate. Therefore, none of the fumes escape intimate contact with the materials.

Figure 10:
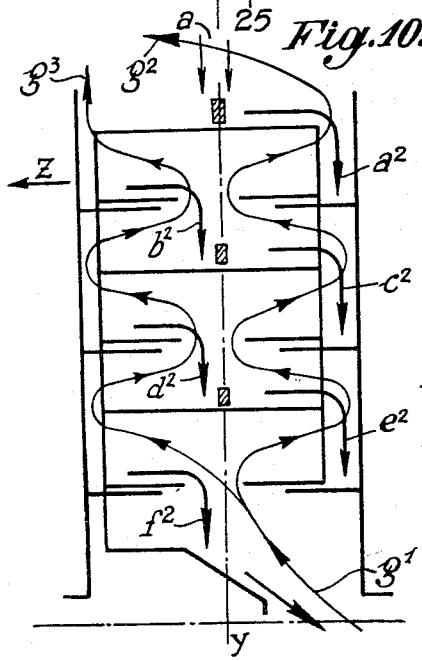

Substantially the same conditions exist in the operation of the device according to the diagrammatic FIGURES 9 and 10 corresponding to the subject of FIGURE 1 except that, in this embodiment, there is a double action in the sense that during the movement of the movable system, 14, 20, 21 in the direction of the arrow $w$ (FIGURE 9) the materials situated on the plates 20 fall to the left of the axis $x$, $y$ on to the angle irons 30 and the corresponding plates 21 to the left of the axis $x$, $y$, while at the same time the materials situated on the plates 21 fall to the right of the axis $x$, $y$, on to the corresponding plates 20 to the right of the axis $x$, $y$, and that during the movement of the movable system, 14, 20, 21 in the direction of the arrow $z$ (FIGURE 10) the materials situated on the plates 20 fall to the right of the axis $x$, $y$ on to the angle irons 30 and the corresponding plates 21 to the right of the axis $x$, $y$, while at the same time the materials situated on the plates 21 fall to the left of the axis $x$, $y$ on to the corresponding plates 20 to the left of the axis $x$, $y$. Here again, therefore, one half of the plates always supplies materials, while there *always* extend through the non-rectilinear, for example more or less sinusodial double current of fumes $g^1$, $g^2$, $g^3$ curtains of materials (except at the dead points, that is to say, during a negligible period of time), or heaps of materials, if the distance between the plates 20 and 21 and/or the quantity and rate of flow of the materials are so chosen or adjusted that the materials accumulate on the said plates in such manner as to form heaps rising up to or approximately up to the corresponding upper plates.

Figure 11:
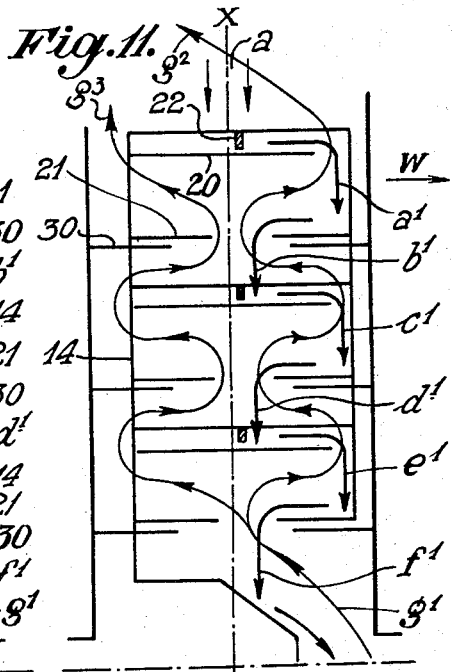
Figure 12:
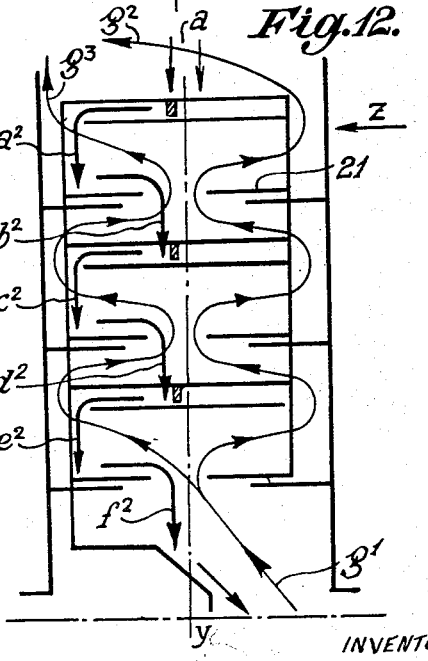

With regard to the constructional from illustrated in FIGURES 11 and 12 (corresponding to that according to FIGURE 6), it might at first sight seem to offer little advantage, because the branches $g^3$ and $g^2$ respectively of the non-rectilinear double current of fumes $g^1$, $g^2$, $g^3$ seem alternately to find a free path therein, because during the movement of the movable system 14, 21, 22 in the direction of the arrow $w$ (FIGURE 11) the materials fall only from the right-hand side of the axis $x$, $y$ from one plate 20 on to the succeeding plate 21, while during the movement of the movable system 14, 21, 22 in the direction of the arrows $z$ (FIGURE 12) the materials fall only on the left-hand side of the axis $x$, $y$ from one plate 20 on to the succeeding plate 21.

This embodiment affords one of the main advantages of the invention, which consists in adjusting the quantities and rates of flow of the materials so as always to have on each plate 20, 21 a heap of materials which closes the space between two successive plates to the desired extent, whereby the fumes are constrained to pass through the heaps of materials in order to reach the output of the apparatus and thus to improve the heat exchange.

The present invention as hereinbefore described also affords the following novel advantages:

The speed of the fumes may be rendered substantially constant by offering thereto a cross-sectional area of flow, and The quantity and rate of flow of the materials may be rendered uniform by virtue of a constant development of the edges of the plates by which the batch is distributed.

Naturally, the invention is not limited to the embodiments and to the constructional details which have been described and illustrated by way of example, and modifications may be made thereto without departing from its scope.

I claim:

1. A method of feeding pulverous charge materials capable of being fritted at a predetermined temperature into a furnace unit having a melting hearth wherein direct heat is applied, feed extension means without direct heat connected to said hearth, a vertical mixing chamber above one end of said feed extension means, an elongated reflecting arch above the other end of said feed extension means and adjacent said hearth, and a molten bath of said materials comprising drawing hot gases from said hearth through said feed extension means, subsequently drawing the resultant partially cooled gases from said feed extension means upwardly through said mixing chamber, passing said charge downwardly through said mixing chamber countercurrent to and mixing intimately with said partially cooled gases to heat said charge near to its fritting temperature, depositing the resultant partially heated charge on the surface of said molten bath in said feed extension means, and propelling said deposited charge under said reflecting arch into said hearth, said arch being heated by said hot gases and reflecting said heat to melt said charge in conjunction with said molten bath as said charge passes to said hearth.

2. In a furnace for charging vitrifiable batch into a molten glass bath including a melting hearth wherein direct heat is applied and a feed extension means without direct heat extending from said hearth, the improvement in combination therewith of a feed unit mounted and positioned for feeding said batch into said feed extension means under gas-tight conditions and comprising a batch storage bin at the top, a heating chamber between said bin and said feed extension means, means for reducing the pressure near the top of said chamber, a series of vertically spaced generally horizontal primary plates mounted in said chamber, a series of scraper plates associated with said primary plates, means to horizontally reciprocate one series of said plates relative to said other series, said primary plates having openings for the upward passage of gas and downward passage of batch, successive openings being in misalignment so that said gas and said batch must travel in tortuous paths, an elongated reflecting arch ceiling in said feed extension means adjacent said hearth and means to propel said batch from said feed extension means to said hearth.

3. The furnace of claim 2 additionally comprising adjusting means for varying the distance between said primary plates.

4. The furnace of claim 2 wherein the distance between the lowest and the immediate preceding primary plates is such that said batch in passing downward to the lowest primary plate will form a mound thereon touching the bottom of the preceding primary plate so that gas moving in the opposite direction will of necessity pass through said batch.

5. The method of claim 1 wherein said pulverous material is vitrifiable batch for glass-making.

6. The method of claim 5 additionally comprising providing a partition between said feed extension means and said hearth.

7. The method of claim 6 additionally comprising maintaining said mixing chamber gas-tight and connecting same to said feed extension means with a gas-tight joint means and producing low pressure at the end of said mixing chamber removed from said feed extension means to draw said gas from said hearth through said feed extension means and said mixing chamber.

8. The method of claim 7 wherein said partially cooled gas moves upwardly and said charge downwardly through said mixing chamber in tortuous paths respectively that include a plurality of horizontal segments.

9. The method of claim 8 wherein said mixing chamber is provided with horizontal plates, the method additionally comprising moving said plates to interrupt the fall of said charge.

10. The method of claim 9 additionally comprising passing said gas through the body of small volumes of said charge at the ends of said plates.

11. The method of claim 9 additionally comprising reciprocating said plates in the horizontal plane.

12. The method of claim 6 additionally comprising cooling said gases finally to below their dew point.

13. The method of claim 6 wherein said gases enter said feed extension means at about 1500° C., enter said mixing chamber at about 800 to 1000° C., and leave said mixing chamber at about 100 to 200° C., and said charge is deposited in said feed extension means at about 700 to 800° C., and leaves at about 1400° C.

14. The furnace of claim 4 wherein said primary plates have a ribbed lower surface so as to have an enlarged surface area for heat transmission.

15. The furnace of claim 4 wherein said primary plates have an upwardly extending rim to retain a thin layer of batch on the top surface of said plates.

References Cited in the file of this patent

UNITED STATES PATENTS

| | | |
|---|---|---|
| Re. 20,828 | Powell | Aug. 16, 1938 |
| 930,086 | Reed | Aug. 3, 1909 |
| 1,610,377 | Hitner | Dec. 14, 1926 |
| 1,611,098 | Borner | Dec. 14, 1926 |
| 1,953,427 | Moorshead | Apr. 13, 1934 |
| 2,533,826 | Lyle | Dec. 12, 1950 |